(No Model.)

P. SCHAU.
BICYCLE TIRE.

No. 557,151. Patented Mar. 31, 1896.

Witnesses
Thomas U. Stuart
Rufus Jones

Phillip Schau, Inventor.
By his Attorney,
Lucius C. West.

UNITED STATES PATENT OFFICE.

PHILLIP SCHAU, OF COOPER, MICHIGAN.

BICYCLE-TIRE.

SPECIFICATION forming part of Letters Patent No. 557,151, dated March 31, 1896.

Application filed July 31, 1895. Serial No. 557,712. (No model.)

*To all whom it may concern:*

Be it known that I, PHILLIP SCHAU, a citizen of the United States, residing at Cooper, (post-office address Kalamazoo,) in the county of Kalamazoo, State of Michigan, have invented a new and useful Bicycle-Tire, of which the following is a specification.

This invention relates to rubber tires for bicycle-wheels and tires for other vehicles, the tread portion of which is sustained by a cushioning-support interposed between said tread and the wheel-rim, and it has for its object to elastically support the tread portion of the tire by a series of integral rubber studs between the tread portion of the tire and the wheel-rim, so constructed and arranged that any exterior pressure of an obstruction on the tread of the tire will act directly upon one or more of the supports, and said supports will act bracing to each other against any lateral sway of the tread, my design being to impart to the tire the beneficial qualities of the pneumatic tire without its objectionable features.

Figure 1:
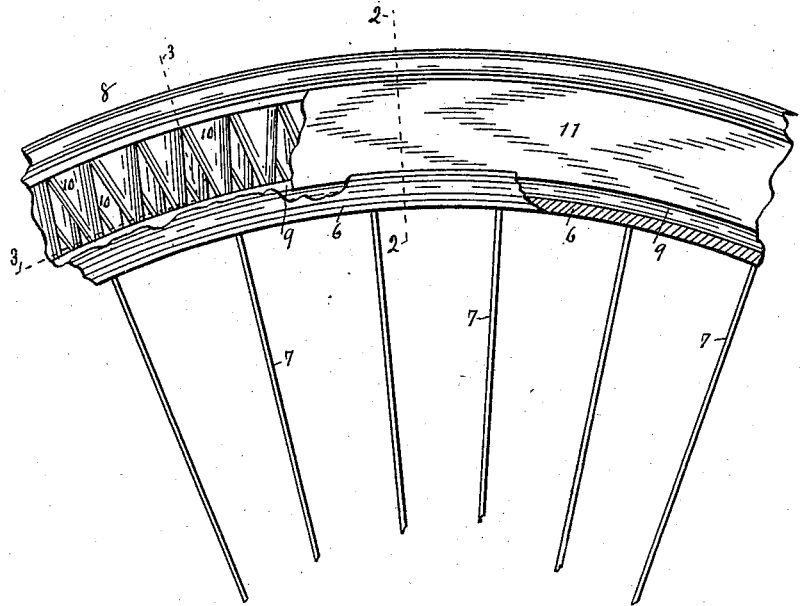
Figure 2:
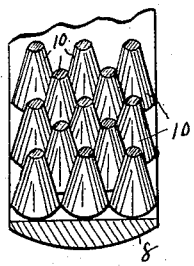
Figure 3:
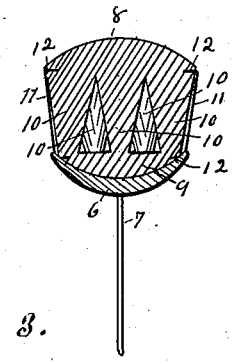

In the drawings forming a part of this specification, Figure 1 is a broken portion of a wheel-rim and tire in side elevation; Fig. 2, an inverted detached part of Fig. 1 in perspective, being in section on the line 3 3, said Fig. 1; Fig. 3, a section on line 2 2 in Fig. 1, looking from a point at the right; and Fig. 4 is a section on line 2 2 in Fig. 1, showing a change from Fig. 3.

Referring to the parts of the drawings pointed out by numbers, 6 is an ordinary wheel-rim, and 7 the spokes, Figs. 1, 2, and 3.

Figure 4:
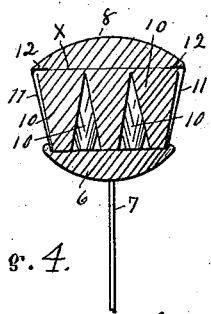

The tire is shown in Figs. 1, 2, and 3, consisting of an outer rubber rim or tread portion 8, an inner rubber rim 9, adapted to fit the metal or wooden rim 6 of the wheel, and a series of transverse rubber studs 10 between the outer and inner rubber rims 8 and 9, cone-shaped, with their small ends pointing in a radial manner toward the hub of the wheel, said small ends being flat or blunt, like the base of the cones 10, only smaller, and either being attached to or integral with the inner rim 9 or resting on the flat inner surface of the same, or, if preferred, resting on the wheel-rim 6 direct, as in Fig. 4, in which latter case the inner rim is dispensed with. The bases of the cones 10 are integral with or attached to the inner flat surface of the tread portion 8, and they are arranged in a series of diagonal rows, the base of each in each row contacting with each other, and the base of said cones in each row fitting in the hollows or angles of its neighboring rows and contacting with the cones therein, so that no portion of the tread part 8 can be pressed upon by obstructions, however small, which the wheel may pass over without said pressure being brought to bear upon one or more of said studs. The object of having the inner surface of the rims 8 and 9 flat is to make room for the series of rows of comparatively small cones or studs 10 and have them upright in position.

The peculiar form and arrangement of the studs thus attached to the rubber rims impart to the tire an elastic or springy buoyancy, and some of the studs have a bracing effect against any tendency of the others to cant over, thus imparting sufficient solidity to the tire and still have the elastic yielding capacity of the pneumatic tire.

It is desirable that the tire shall be provided with shields or curtains 11, Figs. 1, 3, and 4, made of rubber and attached at their upper and lower edges to the rubber rims 8 and 9. This shield or curtain excludes the dirt from contact with the studs 10, and if the pressure is greater on one side of the tire than on the other to any considerable degree the taut curtain or shield 11 on the opposite side will assist in preventing undue canting over of the tire. This shield or curtain 11 may be attached by inserting its edges into the sides of the rubber rims 8 and 9 and be cemented therein, as at 12, Figs. 3 and 4, or any suitable plan may be adopted, so that the studs 10 shall be inclosed. When no inner rubber rim is employed, as in Fig. 4, and shields are employed, the lower edge of the latter may be attached to the sides of the lower ends of the studs.

If preferred, the rubber rims 8 and 9 may be made in separated strips, as line X in Fig. 4 indicates, and the edges of the curtains or shields can be placed between said strips and then all be stuck or cemented together.

Having thus described my invention, what I claim as new, and desire to secure by Letters Patent of the United States, is—

1. A tire comprising the outer tread having flat inner surface, and an inner rim having a flat inner surface, and a series of diagonal rows of cone-shaped studs interposed between the tread and rim, and attached to or integral with one or both, the cones in each row contacting with each other, at the base, and the base of said cones in each row fitting in the hollows of its neighboring rows and contacting with the cones therein, substantially as set forth.

2. A tire having its tread portion provided with a flat inner surface, and cone-shaped studs attached to or integral with said surface, with their small flat ends pointing toward the wheel-hub, the base of said studs contacting with each other in each row, and the base of the studs of each row fitting in the hollows between the studs of the neighboring rows, and contacting with the base of the latter-named studs, substantially as set forth.

In testimony of the foregoing I have hereunto subscribed my name in the presence of two witnesses.

PHILLIP SCHAU.

Witnesses:
LEVI. F. COX,
LUCIUS C. WEST.